PATENTED JAN 19 1971

INVENTOR.
Satoshi Tanigame
BY
[signature]
Attorney

Thomas N. Busch
Cyrus E. Hoadley
INVENTORS

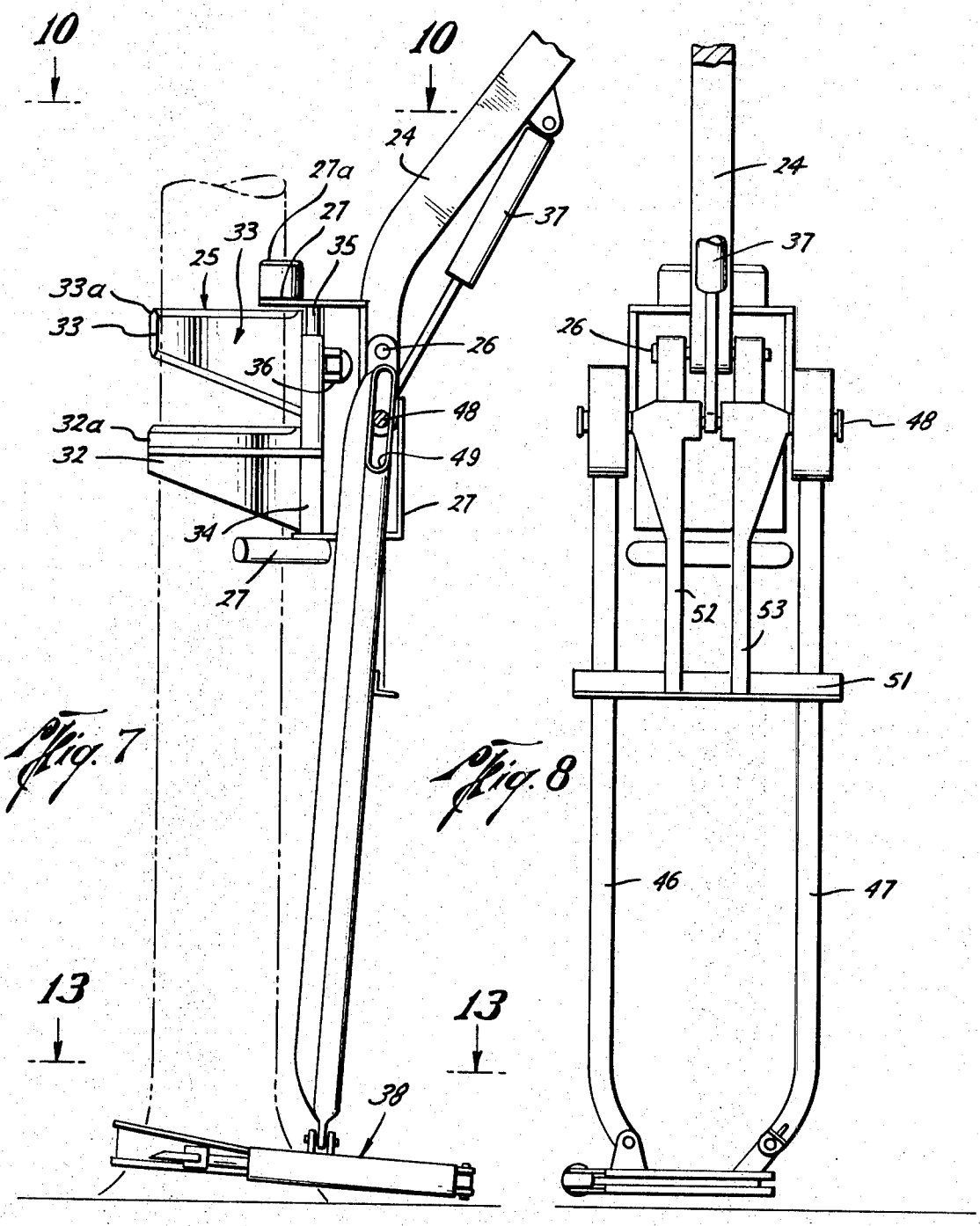

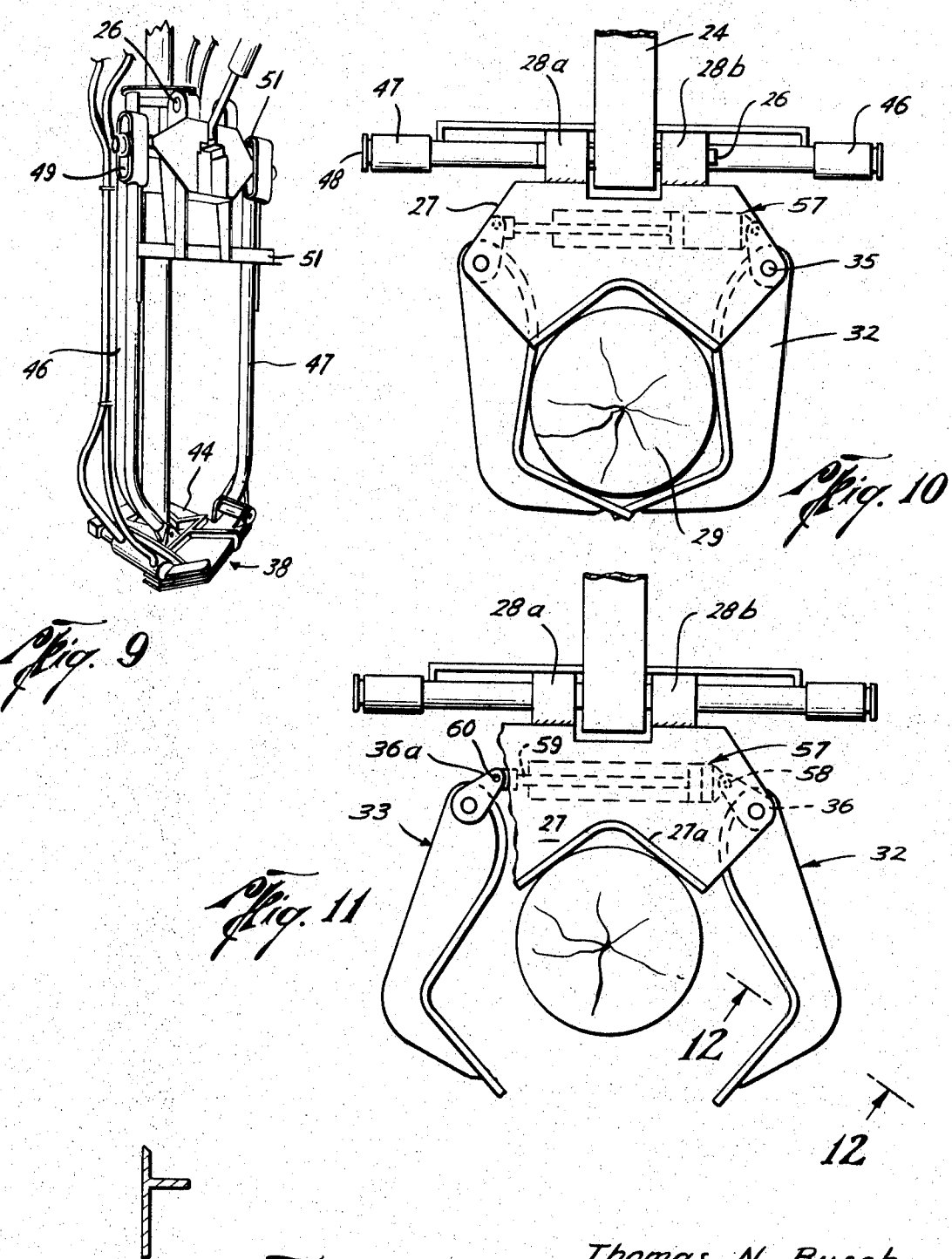

PATENTED JAN 19 1971

Thomas N. Busch
Cyrus E. Hoadley
INVENTORS

BY
ATTORNEYS

Thomas N. Busch
Cyrus E. Hoadley
INVENTORS

BY J. Vincent Martin
Joe E. Edwards

ATTORNEYS

TREE HARVESTER

This invention relates to tree harvesters and, in the preferred embodiment, to a tree harvester capable of cutting a path through a forest and bringing out the cut trees in sections suitable for use as pulpwood.

In many pulpwood forests the trees are found to be very close together and, after a number of years' growth, will be found to be very tall and slender. In order to stimulate an increase in diameter of the tree is desirable to thin the forest. This may be done by cutting paths at frequent intervals through the forest to permit air and sunshine to penetrate. For instance, a forest may be checkerboarded with paths of approximately 20 feet in width to permit air and sunshine to reach the trees and stimulate their growth.

While the tree harvester of this invention may be used in any instance in which it is desired to cut and process trees, it was developed primarily as a machine for cutting a path through a dense forest. For this purpose, the machine is capable of traveling through the forest in a straight path and reaching out in front of the machine, felling a tree, moving the tree back over the machine, and bucking it into sections by a buck shear on the base of the machine. Preferably, these sections are caught in receiving means and after the receiver is full the machine may offload the sections for pickup by other equipment or may proceed to a central location to deposit the cut sections for further handling.

Desirably, the felling of trees is accomplished with a fell shear carried on a boom which may be manipulated to introduce the tree into a bucking system in which the buck shear is mounted on the machine. There has been no known machine available to carryout this operation, and it is the principal object of this invention to provide a tree harvester in which a boom carries the fell shear and is manipulated to the felled tree for further processing into sections, without interference from the fell shear.

Another object is to provide an economical tree harvester which can fell a tree in front of the harvester, feed the tree through a buck shear on the harvester base, and buck it into sections which will fall into a receiver on the rear section of the harvester.

Another object is to provide a tree harvester capable of cutting a path through a forest and bringing out the trees cut in sections loaded on the harvester.

Another object is to provide a tree harvester with an articulating boom having a fell shear thereon in which the boom may turn the felled tree to a substantially horizontal position for further processing by a buck shear mounted on the frame of the harvester without interference from the fell shear.

Another object is to provide a tree harvester in which means for guiding the felled tree into the buck shear closes about the tree in response to retraction of the boom to place the tree in position to be fed through the buck shear.

Another object is to provide a boom having a fell shear thereon in which, after the tree has been felled, the shear moves into an out-of-the-way position to permit handling of the tree by the boom without interference from the shear.

Another object is to provide a tree-processing machine having a boom for gripping a tree and a free-hanging shear thereon wherein, as the tree-gripping means moves into position to grip the tree, the fell shear is automatically moved into position to fell the tree.

Another object is to provide a tree harvester having a gripping device for gripping a tree in which the arms gripping the tree are permitted to conform to the tree each independently of the other.

Another object is to provide a tree-harvesting machine having a fell shear depending from a boom in which the tendency of the beveled shear blade to tilt the fell shear is prevented.

Other objects, features and advantages of this invention will be apparent from the specification, the drawings and the claims.

In the drawings, wherein like numerals indicate like parts and wherein a preferred embodiment of this invention is illustrated, FIG. 1 is a diagrammatic illustration of a tree harvested constructed in accordance with this invention in position to begin processing a tree;

FIG. 7 is a view on an enlarged scale in side elevation of the outboard end of the boom illustrating the grasping means, the fell shear and the mounting therefor;

FIG. 8 is a view from the rear of the structure shown in FIG. 7;

FIG. 9 is an isometric view of the tree-grasping means, the fell shear, and the supporting means therefor;

FIG. 10 is a view along the line 10–10 of FIG. 7;

FIG. 11 is a view similar to FIG 10 with the grasping arms shown in open position;

FIG. 12 is a view along the line 12–12 of FIG. 11;

Figure 3:
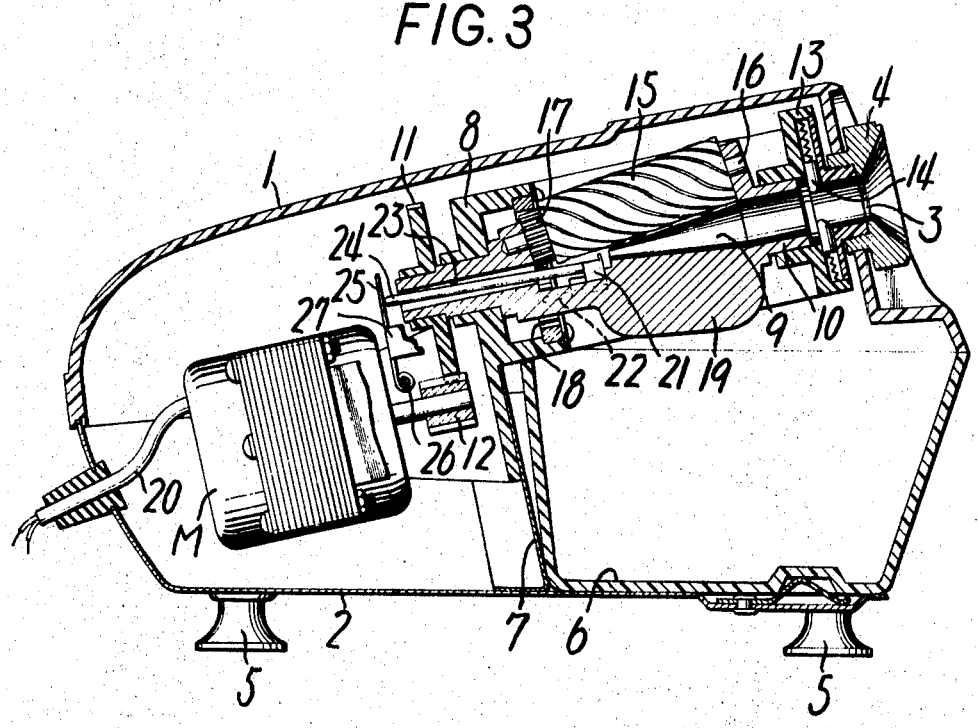
FIG. 3 is a view similar to FIG. 2 showing the tree in the process of being turned to a substantially horizontal position.

The tree harvester may employ any desired base, preferably mobile. In the drawings the base indicated generally at 10 is mounted on endless tracks 11 and 12. Alternatively the base may follow the construction of U.S. Pat. No. 3,196,911 and be mounted on pneumatic tires as illustrated therein.

A buck shear indicated generally at 13 is mounted on the base in any desired manner. Preferably, the mounting of the buck shear will be in accordance with the teaching of the application of Cyrus E. Hoadley, Ser. No. 739,865 filed on even date herewith. The buck shear may be constructed in any desired manner, as for instance in the manner taught in U.S. Pat. No. 3,196,911.

Figure 16:
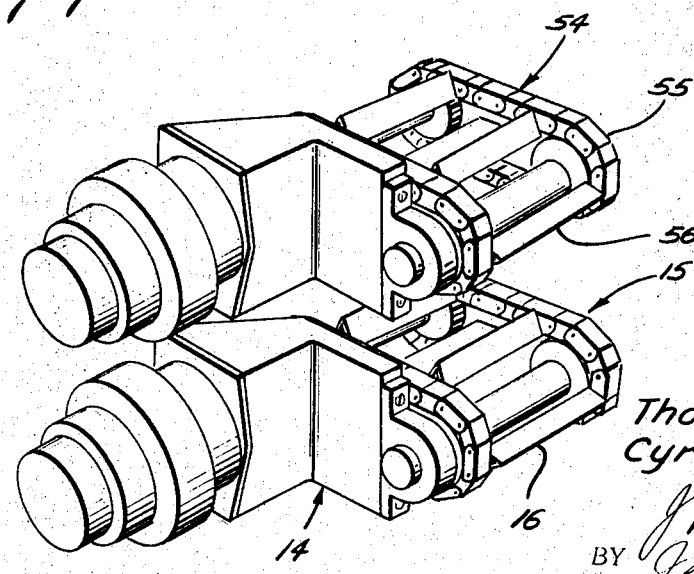
FIG. 16 is an isometric view of the upper and lower roller means for moving the felled tree through the buck shear.

An upwardly facing means for engaging a tree moving through the buck shear is provided by the roller means indicated generally at 14. As shown in FIG. 16, this roller means is preferably in the form of an endless track 15 having means thereon for gripping a tree such as the blades 16 carried by the endless track. This upwardly facing means 14 is preferably designed to support the weight of one end of a tree and to position it for introduction into the buck shear 13. The upwardly facing means 14 may take any desired form which will accomplish the positioning function. While the means 14 is shown to be mounted on frame member 17 carried by the base 10, it may be mounted in any desired manner which will accomplish the function of positioning a log when the boom indicated generally at 18 is retracted as will be explained hereinafter.

Figure 14:
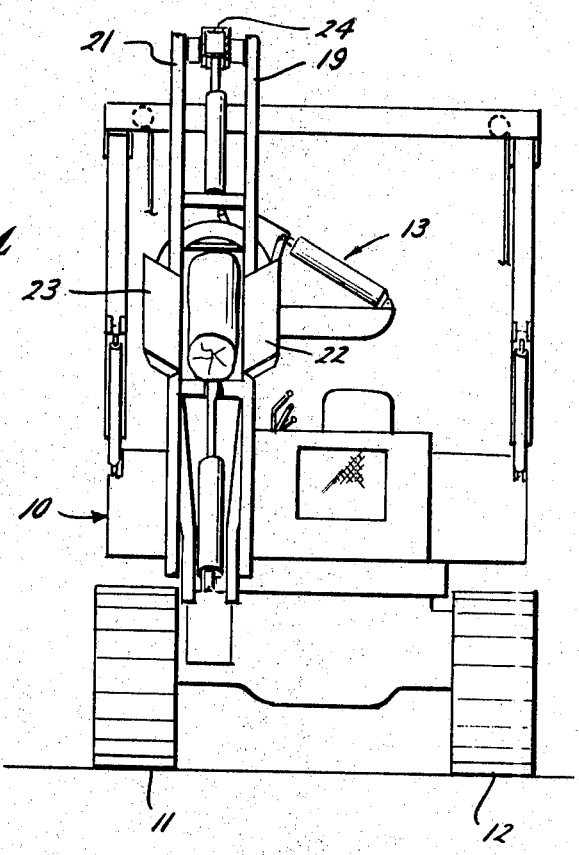
FIG. 14 is a view along the line 14–14 of FIG. 5.

In order to cut down and position a tree for feeding through the buck shear 13, a boom indicated generally at 18 is pivotally mounted on base 10. This is an articulating boom having an inner arm provided by spaced member 19 and 21 (FIG. 14). By suing the spaced members 19 and 21 to provide the inner arm, the load on the arm will be generally vertical, and any twisting moments will be minimized if not eliminated. It will be noted from FIG. 14 that as a log is fed to the buck shear it passes between the arms 19 and 21 and is guided into this position by the guide plates 22 and 23 carried by the inner arm.

The outer arm 24 is preferably a single member as best seen in FIG. 14. The arm 24 is pivoted to the inner arm at 25 in conventional manner.

Means are provided on the outer arm for grasping and manipulating a tree. Preferably, the grasping means is located at the end of the outer arm and is pivotally carried on the outer arm by pivot shaft 26. (See FIGS. 7, 8, 10 and 11).

The grasping means may take any desired form. In the illustrated embodiment, the means includes an anvil 27 which has suitably welded thereto ears 28a and 28b which form a part of the pivot structure for securing the grasping means to the outer arm 24. The anvil section 27 has a forwardly facing (relative to the base) angled section 27a to generally conform to the configuration of a tree 29. This structure may take any generally curved form, but is it has been found that an angled configuration such as shown in FIG. 10 is satisfactory.

A pair of crank arms are pivoted to opposite side of the anvil and urged toward tree-grasping position, preferably by a hydraulic motor.

The crank arm on one side is provided by angled arm 32 welded to a sleeve 34. The sleeve 34 receives pivot pin 35 carried by the anvil. Ears 36 are welded to the sleeve 34 and complete the crank arm. The crank arm indicated generally at 33 on the other side of the anvil is a mirror image of the arm discussed above. The configuration of the angled portions 32 and 33 of the crank arms may take any desired form, which will generally cooperate with the anvil 27 to encircle and grasp a tree.

In order to provide for delimbing a tree as it is moved through the machine, the arms 32 and 33 preferably have their upper edges beveled as shown at 32a and 33a to provide a sharp cutting edge which will remove branches from the tree. The upper edge 27a of the anvil is also beveled for the same purpose. As the grasping means completely encircles the tree and there is provided on an upwardly facing beveled edge completely encircling the tree, all limbs will be removed from the tree as the tree is moved through the grasping means.

In order to provide for handling of the tree after it is felled, a power means such as the hydraulic piston cylinder assembly indicated generally at 37 is provided between the outer arm 24 and the grasping means. As the grasping means is mounted for swinging movement in a vertical plane about the pivot 26, it will be apparent that operation of the hydraulic motor 37 will swing the grasping means in a vertical plane.

It will be apparent that the tree harvester as thus far described could be utilized to pick up precut trees and process them. However, it is preferred that the tree harvester also be provided with means for felling the tree and for this purpose a fell shear indicated generally at 38 is provided. The fell shear may take any desired configuration and reference to U.S. Pat. No. 3,196,911 is made for detailed disclosure and discussion of fell shears and their construction The fell shear illustrated includes an anvil section 39 to which there is pivotally attached a blade 40 having a beveled cutting edge 41. The blade is pivoted at 42 and is moved about the pivot 42 by the hydraulic motor 43 provided by a conventional piston and cylinder arrangement. The forces acting on the blade 40, as it passes through the tree, tend to cause the fell shear to rotate relative to the tree during closing of the shear. To counteract this action, an upstanding plate 44 is provided which engages the anvil side of the tree during the cut. This counteracts the tendency of the fell shear to rotate during the making of a cut. In addition, it assists in aligning the shear perpendicular to the tree prior to the start of a cut.

Figure 4:
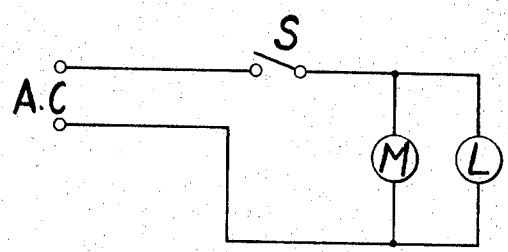
FIG. 4 is a view similar to FIG. 3 showing the boom to have been retracted and the tree to be in a position to be introduced to the buck shear.

From the drawings it is apparent that the fell shear is a fairly large device, and if it were to remain in operative position when the tree is rotated to a generally horizontal position and moved into position to be acted on by the fell shear as indicated in FIG. 4, that the fell shear would interfere.

In order to avoid any interference from the fell shear, a support for supporting the fell shear from the boom is provided which supports the fell shear in one position for felling the tree and in another position after the tree had has been felled in which the shear does not engage the tree as the grasping means and the tree are swung in a vertical plane. Preferably this support means is one in which a lost motion connection is provided between the fell shear and the outer arm 24 so that the tree may be felled with the lost motion connection retracted or completely taken up and then lifting of the boom and the tree will permit the lost motion connection to be extended to a position where the fell shear is below the cutoff tree to permit the tree to clear the fell shear as it is rotated.

In the preferred form the support means is provided by a pair of spaced support members 46 and 47. The support members 46 and 47 include a lost motion connection which is preferably provided at the upper end thereof. As shown in FIGS. 7 and 8, the anvil section 27 of the gripping means carries a long pivot pin 48. Support member 46 has provided at its upper end a slot 49 and the support member 47 has a like slot 50. The construction is such that the support members are free to move up and down over the pivot pin 48 and to swing in a vertical plane about this pin. Thus, with the lost motion connection taken up so that there is appreciable clearance between the top of the slots 49—50 and the pin 48, the shear 38 may be activated to fell the tree. Thereafter, by raising the grasping means to a point where pin 48 is in the top of slots 49—50 the fell shear will be moved down relative to the grasping means and will clear the tree. It will be noted that the supports 46 and 47 have sufficient clearance therebetween to permit the tree to rotate vertically between the supports 46 and 47. Thus, the fell shear will not interfere with processing of the tree after it is felled.

In accordance with this invention, means are provided for crowding the fell shear into the tree as the grasping means is moved into engagement with the tree. This means is provided by a crowder bar 51 carried by the grasping means. The bar is carried on arms 52 and 53 (FIG. 8) and extends behind and in a position to engage the support arms 46 and 47. As the crowder bar 51 is rigidly attached to the grasping means, it urges the fell shear into engagement with the tree as the grasping means is moved into position to grasp the tree. (Note FIG. 7).

After the tree is felled, the boom is raised to take the slack out of the lost motion connection, the grasping means is rotated to bring the tree to generally horizontal position, and the boom is retracted to lay the butt end of the tree on the upwardly facing engaging means 14.

In accordance with this invention a downwardly facing engaging means is carried by the boom to engage the tree and hold it in proper position for passing through the bucking shear. This downwardly facing engaging means indicated generally at 54 is carried by the boom and preferably carried by the inner arm. The downwardly facing means may be substantially identical to the upwardly facing means 14 and may be provided by the endless track 55. This track will have the blades 56 carried thereby to engage the tree where the downwardly facing means is used as a power means.

Preferably, at least one of the upwardly and downwardly facing means is used as a means for moving the felled tree through the buck shear. In the illustrated embodiment both of the upwardly and downwardly facing means are provided with hydraulic motors to drive their endless tracks and move the tree through the buck shear.

Power means are provided for extending the boom, operating the grasping means to engage the tree and for retracting the boom to a retracted position in which the tree engages the upwardly facing means 14 and the downwardly facing means 54 engages the tree. Preferably such means is provided by hydraulic motors such as the hydraulic piston-cylinder combinations illustrated. The hydraulic motor 37 for swinging the gripping means has already been referred to. The gripping means is also provided with a hydraulic motor provided by a piston and cylinder arrangement indicated generally at 57 (FIGS. 10 and 11). This hydraulic motor is provided with a pivotal connection at 58 between the cylinder and the crank arm 36. The connecting rod 59 has a pivotal connection 60 with the crank arm 36a. Thus as the hydraulic motor 57 is extended to close the gripping arms about the tree, the arms are permitted to float and conform to the configuration of the tree.

Figure 15:
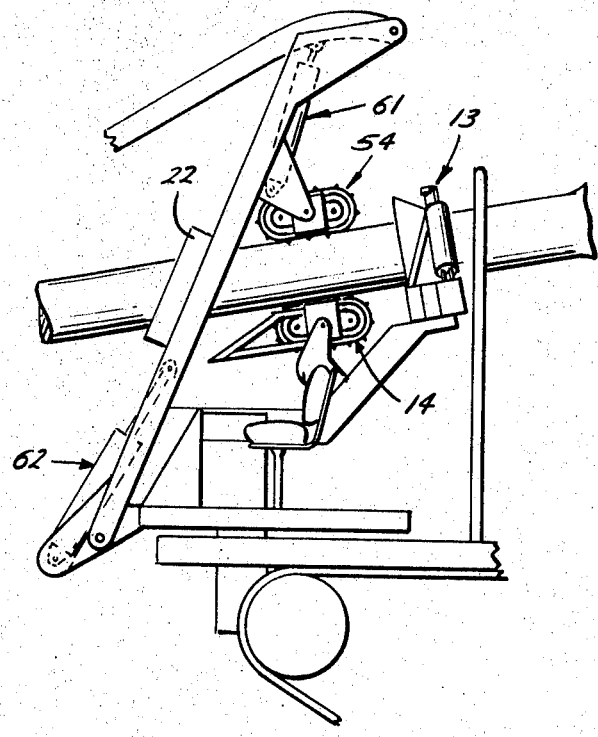
FIG. 15 is a fragmentary side view of the machine illustrating the tree passing through the buck shear.

A hydraulic motor provided by another piston and cylinder arrangement indicated generally at 61 controls swinging movement of the outer arm 24 (FIG. 15). A similar hydraulic motor provided by piston and cylinder indicated generally at 62 controls swinging movement of the inner arm 19—21 (FIG. 15). It will be apparent that the means for handling the grasping means and the boom may be provided in any desired manner but the hydraulic piston and cylinder arrangement illustrated is preferred due to its simplicity.

Figure 6:
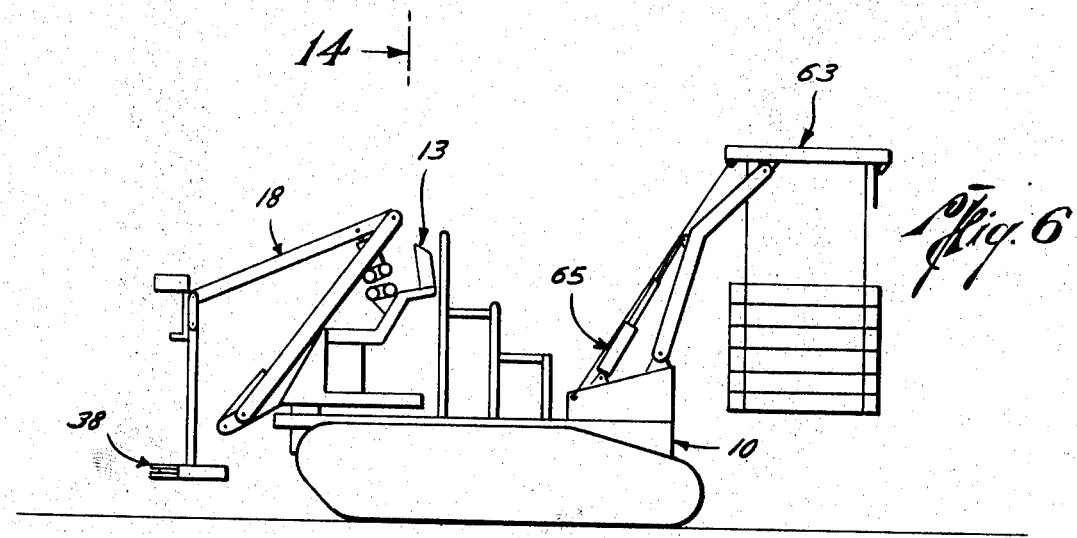
FIG. 6 is a view similar to FIG. 5 showing the boom in fully retracted position and the harvester unloading the sections of trees which have been previously processed.
Figure 13:
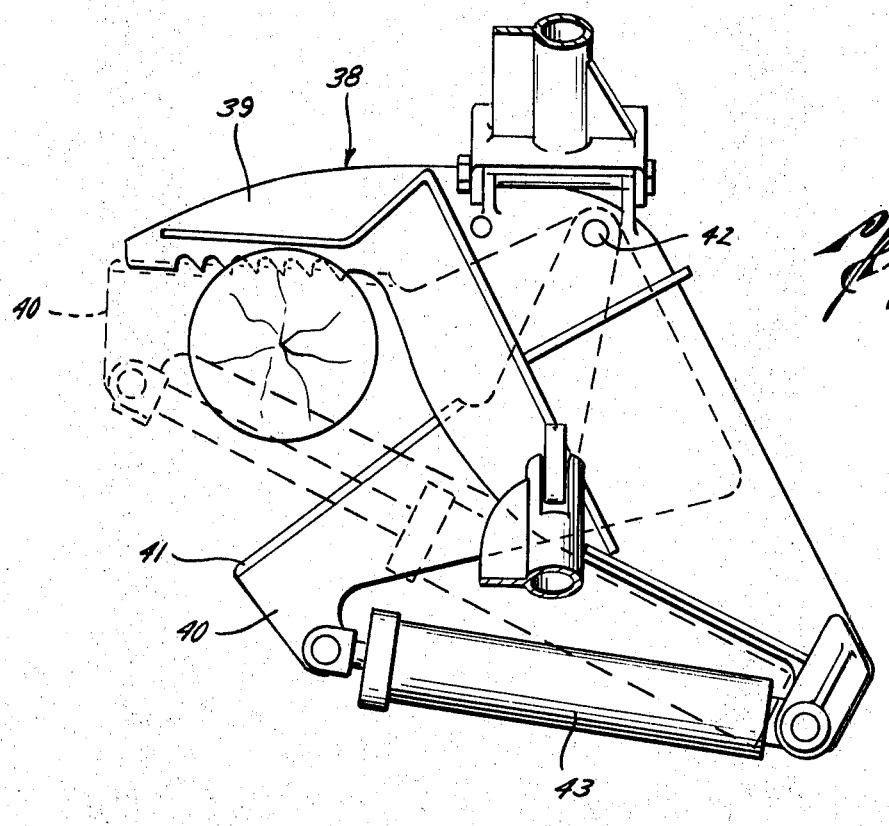
FIG. 13 is a view along the line 13–13 of FIG. 7.

Preferably means are provided for catching the sections of logs as they are bucked from the tree for transporting the sections and off-loading them at a suitable location. Preferably this means includes a cable sling arrangement indicated generally at 63. The logs are caught in the cable sling and then the sling is moved out over the rear of the base as shown in FIG. 6 for off-loading at a desirable location. Reference is made to U.S. Pat. No 3,198,225 for a complete discussion and disclosure of this catching and off-loading means.

Reference is made to FIGS. 1 through 6 which successively illustrate the operation of the structure.

Figure 1:
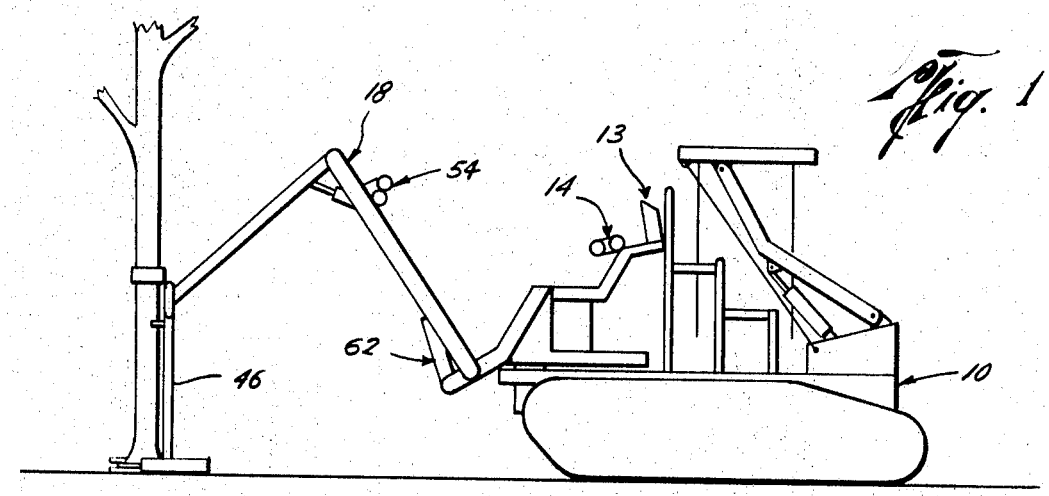
FIG. 1 is a view similar to FIG. 1 showing the tree to have been felled and the boom to have been slightly raised.
Figure 2:
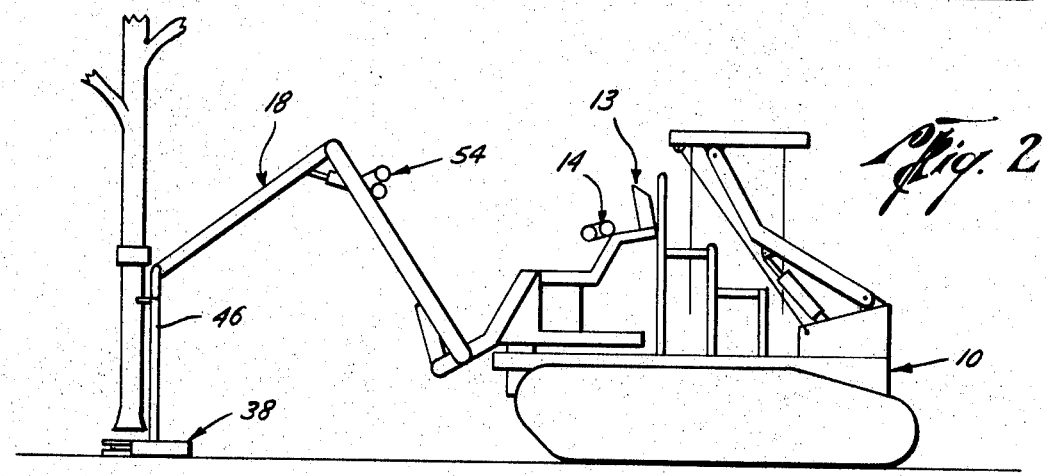
Figure 3:
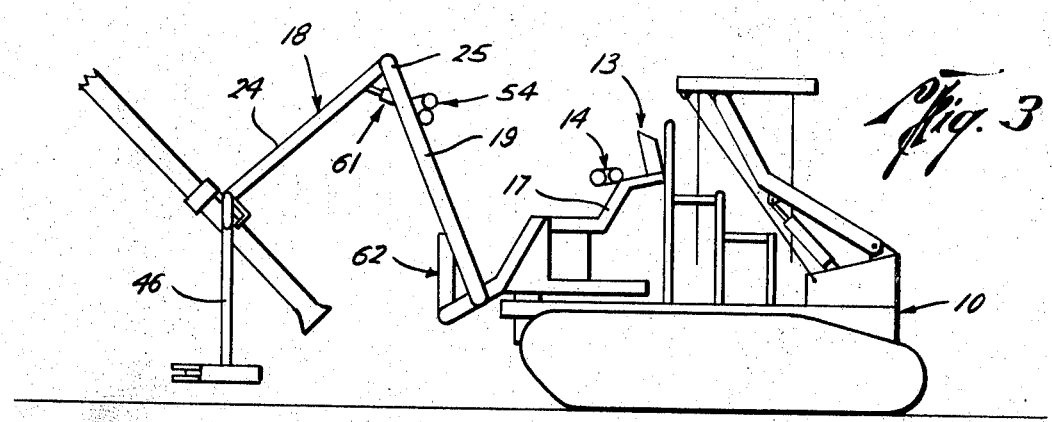
Figure 4:
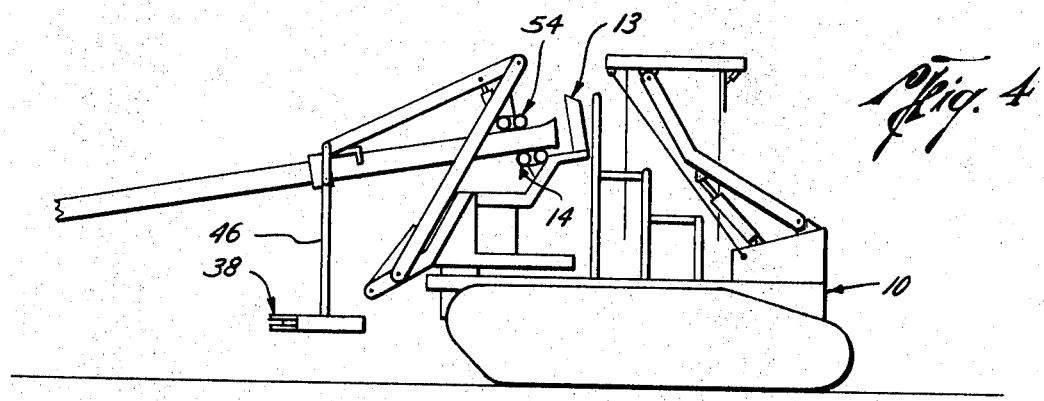

In FIG. 1 the vehicle has been positioned with the boom extended to the front of the vehicle and the grasping means grasping a tree with the fell shear in position to make a cut. The lost motion connection in the fell shear support is contracted. With the parts in the position shown in FIG. 1, the fell shear is activated to fell the tree. After the tree has been felled or severed at substantially ground level, the boom 18 is raised to take the slack out of the lost motion connection in the support arms 46 and 47. With the lost motion extended as shown in FIG. 2, the tree is above the fell shear 38, and as shown in FIG. 3 the grasping means may be rotated to rotate the tree between the two support members 46 and 47 toward a substantially horizontal position. It will be noted that as the tree is rotated, the fell shear hangs vertically and as the tree is moved to a point where the butt of the tree engages the upwardly facing rollers 14 as shown in FIG. 4 the fell shear hangs in an out-of-the-way position.

As the boom is retracted to position the tree on the support rollers 14, the downwardly facing rollers 54 come into engagement with the tree so that the tree is firmly positioned between the two sets of rollers. Lateral movement is prevented by the two arms 19 and 21 which make up the inner boom arm through which the tree had has passed during the rotation of the grasping means and retraction of the boom.

At this point in the operation the means for feeding the tree through the buck shear 13 is energized. In the illustrated form is provided by the roller means 14 and 54 and these are to draw the tree into and through the buck shear 13. As the tree is drawn through the buck shear, the grasping means will delimb the tree. If necessary, the force with which the grasping means is gripping the tree may be reduced slightly to permit the tree to merely rest in the grip of the grasping means so that the tree may be pulled therethrough to delimb the tree as shown in FIG. 5.

As the tree passes through the buck shear 13, it strikes the flag 64 which energizes the buck shear to buck off a section of the tree. In order to prevent the tree from binding the buck shear blade, the flag 64, when energized, deenergizes the drive means provided by the roller means 14 and 54 so that movement of the tree through the buck shear is stopped at the time that a section is being bucked off.

Figure 5:
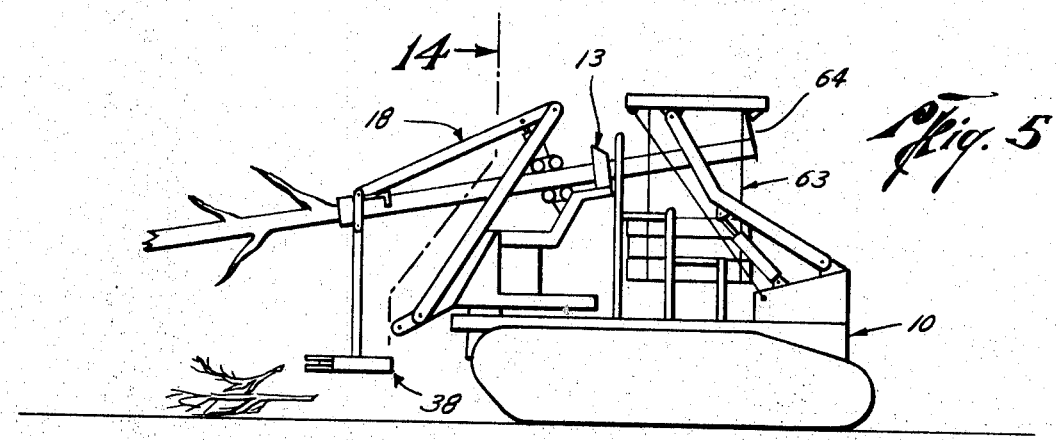
FIG. 5 is a view similar to FIG. 4 showing the tree being delimbed and bucked into sections.

The severed sections fall into the sling 63 as shown in FIG. 5. After the sling is filled, the vehicle is preferably moved to a central loading section where the hydraulic motor, indicated generally at 65, is actuated to extend the sling over the rear of the base and the sling is then let down and the logs deposited at the central loading station, as more fully explained in the above-identified patent.

It should be noted that the support means for the fell shear may take any desired form in which the relative position between the attachment of the support to the outer arm and the fell shear can be adjusted. For instance, chains may be used, but chains are not considered as satisfactory as the arrangement shown.

The grasping means may take any desired form, and, as preferred in this disclosure, may also serve as a delimbing means, or the delimbing means may be provided by separate device.

While shears are preferred, it is of course apparent that either or both of the fell shear or buck shear could be replaced by saws.

The upper roller means 54 is preferably carried by the inner arm as shown in FIG. 15. It is apparent, however, that it could be carried by the outer arm and engage the tree trunk at a point between the grasping means and the lower roller means 14.

While it is preferable to utilize the fell shear and carry out the entire tree-handling operation from a single base, it is of course apparent that the tree could be prefelled and the remainder of the tree harvester utilized in the manner taught.

While it is preferred to catch the tree sections as they are bucked off, they could instead be dropped onto the ground to be handled by another vehicle.

The foregoing disclosure and description of the invention are illustrative and explanatory thereof and various changes in the size, shape and materials, as well as in the details of the illustrated construction, may be made within the scope of the appended claims without departing from the spirit of the invention.

We claim:

1. A tree harvester comprising:

a base;

a buck shear mounted on said base for bucking a tree into sections;

upwardly facing means for engaging a tree moving through said buck shear;

an articulating boom having inner and outer arms mounted on said base;

means on said outer arm for grasping a tree;

downwardly facing means mounted on said boom for engaging a tree moving through said buck shear when the boom is retracted;

means for extending said boom and operating said grasping means to engage a tree and for retracting the boom to retracted position in which the tree is engaged by said upwardly and downwardly facing means;

said upwardly and downwardly facing means together with said grasping means aligning the tree for movement through the buck shear; and means for feeding the tree through said buck shear.

2. The tree harvester of claim 1 wherein the grasping means delimbs the tree as it is moved therethrough.

3. The tree harvester of claim 1 in combination with means for swinging said grasping means in a vertical plane, a fell shear supported from the boom in one position to fell a tree and in another position after the tree has been felled in which the shear does not engage the tree as the grasping means and felled tree are swung in a vertical plane.

4. The tree harvester of claim 1 in combination with:

means for swinging said grasping means in a vertical plane;

a fell shear;

support means including a lost motion connection supporting said fell shear from the boom;

said support means and said fell shear being in an out-of-the-way position when the lost motion connection is in extended position to permit the tree to be swung in a vertical plane by the grasping means after the tree has been felled with the lost motion connection in retracted position.

5. The tree harvester of claim 1 in combination with means for swinging said grasping means in a vertical plane:

a fell shear;

spaced supports extending upwardly from said fell shear;

and a lost motion connection between the spaced supports and boom with the plane of the supports extending perpendicular to the plane of the boom permitting the tree to be felled with the lost motion connection in retracted position and the tree to be swung in a vertical plane between the supports by the grasping means without interference from the fell shear when the boom is raised and the lost motion connection extended.

6. A tree harvester comprising:
a mobile base;
a buck shear mounted on said base for bucking a tree into sections;
upwardly facing roller means for engaging a tree moving through said buck shear;
an articulating boom having inner and outer arms mounted on said base;
means on the free end of said outer arm for grasping a tree, said grasping means mounted for swinging movement in a vertical plane;
downwardly facing roller means mounted on said inner arm for engaging a tree moving through said buck shear when the boom is retracted;
means driving at least one of said roller means to move a tree through said buck shear;
power means for extending said boom and operating said grasping means to engage a tree and swing it in a vertical plane and for retracting the boom to retracted position in which the tree is engaged by said upwardly and downwardly facing roller means; and
said roller means and said grasping means aligning the tree for movement through the buck shear.

7. A tree harvester comprising:
a base;
a boom mounted on said base;
means mounted on said boom for swinging movement in a vertical plane for grasping a tree;
power means for swinging said grasping means;
a fell shear;
means supporting the fell shear from the boom in a position to fell a tree and in another position after the tree has been felled in which the shear does not engage the tree as the grasping means and felled shear are swung in a vertical plane; and
said supporting means positioning the shear vertically below the butt end of the felled tree after the tree has been felled and the boom has been raised.

8. The tree harvester of claim 7 wherein a crowder is carried by the boom and urges the fell shear toward a tree in response to positioning of the grasping means in a position to grasp the tree.

9. The tree harvester of claim 7 wherein the grasping means provides means for delimbing a tree and is provided by an anvil and a pair of crank arms pivoted to opposite sides of the anvil and urged toward tree-grasping position by a fluid motor means pivoted between the arms, and means for moving a tree through the grasping means.

10. A tree harvester comprising:
a base;
a boom mounted on said base;
means mounted on said boom for swinging movement in a vertical plane for grasping a tree;
power means for swinging said grasping means;
a fell shear;
means supporting the fell shear from the boom in a position to fell a tree and in another position after the tree has been felled in which the shear does not engage the tree as the grasping means and felled tree are swung in a vertical plane; and
said support means including a lost motion connection providing for the change in position of the shear relative to the boom.

11. The tree harvester of claim 10 wherein the support means includes spaced supports and said lost motion connection is between the shear and boom with the plane of the supports extending perpendicular to the plane of the boom permitting the tree to be felled with the lost motion connection in retracted position and the tree to be swung in a vertical plane between the supports by the grasping means without interference from the fell shear when the boom is raised and the lost motion connection extended.

12. The tree harvester of claim 10 wherein the support means includes spaced supports hinged to the boom to permit movement of the supports relative to the shear in the same plane and said lost motion connection is between the shear and boom with the plane of the supports extending perpendicular to the plane of the boom permitting the tree to be felled with the lost motion connection in retracted position and the tree to be swung in a vertical plane between the supports by the grasping means without interference from the fell shear when the boom is raised and the lost motion connection extended.

13 A tree harvester comprising, a base, a boom mounted on said base, means mounted on said boom for swinging movement in a vertical plane for grasping a tree, power means for swinging said grasping means, a fell shear, means supporting the fell shear from the boom in a position to fell a tree and in another position after the tree has been felled in which the shear does not engage the tree as the grasping means and felled tree are swung in a vertical plane, wherein the fell shear includes an anvil and a shear blade with the cutting edge beveled, and an upright plate on the anvil positioned to engage the tree to resist cocking of the shear relative to the tree due to the forces acting on the beveled blade.

14. A tree harvester comprising:
a mobile base;
a buck shear mounted on said base for bucking a tree into sections;
upwardly facing roller means for engaging a tree moving through said buck shear;
an articulating boom having inner and outer arms mounted on said base;
means on the free end of said outer arm for grasping a tree;
said grasping means mounted for swinging movement in a vertical plane;
downwardly facing roller means mounted on said inner arm for engaging a tree moving through said buck shear when the boom is retracted;
means driving at least one of said roller means to move a tree through said buck shear;
a fell shear;
support means for the fell shear including space supports and a lost motion connection between the shear and boom with the plane of the supports extending perpendicular to the plane of the boom permitting the tree to be felled with the lost motion connection in retracted position and the tree to be swung in a vertical plane between the supports by the grasping means without interference from the fell shear when the boom is raised and the lost motion connection extended;
power means for extending said boom and operating said grasping means to engage a tree and after the tree has been felled for retracting the boom to retracted position in which the tree is engaged by said upwardly and said downwardly facing roller means; and
said roller means and said grasping means aligning the tree for movement through the buck shear.